US008001562B2

(12) United States Patent
Yamasaki et al.

(10) Patent No.: US 8,001,562 B2
(45) Date of Patent: Aug. 16, 2011

(54) SCENE INFORMATION EXTRACTION METHOD, AND SCENE EXTRACTION METHOD AND APPARATUS

(75) Inventors: Tomohiro Yamasaki, Kawasaki (JP); Hideki Tsutsui, Kawasaki (JP); Sogo Tsuboi, Kawasaki (JP); Chikao Tsuchiya, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1184 days.

(21) Appl. No.: 11/723,227

(22) Filed: Mar. 19, 2007

(65) Prior Publication Data

US 2007/0239447 A1 Oct. 11, 2007

(30) Foreign Application Priority Data

Mar. 27, 2006 (JP) ................................ 2006-086035

(51) Int. Cl.
*H04N 7/173* (2011.01)

(52) U.S. Cl. ................................ 725/24; 725/9; 725/13

(58) Field of Classification Search ................ 725/9, 13, 725/24, 114; 715/723
See application file for complete search history.

(56) References Cited

U.S. PATENT DOCUMENTS 6,580,437 B1 * 6/2003 Liou et al. ..................... 715/719
7,209,942 B1 * 4/2007 Hori et al. ..................... 709/203
7,284,032 B2 * 10/2007 Weber ........................... 709/204
2005/0060741 A1 3/2005 Tsutsui et al.
2010/0287473 A1 * 11/2010 Recesso et al. ............... 715/716

FOREIGN PATENT DOCUMENTS

JP 2004-173102 6/2004
JP 2005-167452 6/2005

* cited by examiner

*Primary Examiner* — Hunter B Lonsberry
*Assistant Examiner* — John Schnurr
(74) *Attorney, Agent, or Firm* — Finnegan, Henderson, Farabow, Garrett & Dunner, L.L.P.

(57) ABSTRACT

An apparatus includes unit acquiring comment information items related to video content, each of the comment information items including a comment, and a start time and an end time of the comment, unit dividing the comment into words by morpheme analysis for each of the comment information items, unit acquiring an estimated value of each of the words, the estimated value indicating a degree of importance used when the scenes are extracted, unit adding the acquired estimated value of each of the words for each of the words during a period of time ranging from the start time to the end time of the comment that contains a corresponding word to acquire estimated value distributions of the words, and unit extracting a start time and an end time of one scene and to be extracted from the video content, based on a shape of the estimated value distributions.

20 Claims, 9 Drawing Sheets

| Word | Article | Comment identifier |
|---|---|---|
| This | Adjective | 1 , 3 |
| Mountain | Noun | 1 , 2 , 3 |
| appears | Verb | 1 |
| That | Adjective | 1 |
| ⋮ | ⋮ | ⋮ |

FIG. 3

| Word | Article | Comment identifier |
|---|---|---|
| This | Adjective | 1 , 3 |
| Mountain | Noun | 1 , 2 , 3 |
| Appears | Verb | 1 |
| In | Preposition | 1 |
| That | Adjective | 1 |
| Movie | Noun | 1 |
| It | Pronoun | 1 |
| Magnificent | Adjective | 2 , 4 |
| What | Interrogative pronoun | 3 |
| Is | Verb | 3 |
| Mt. Aso | Proper noun | 4 |
| ⋮ | ⋮ | ⋮ |

FIG. 5

| Comment identifier | Parent comment identifier | User identifier | Comment posted time | Content identifier | Start time | End time | Comments |
|---|---|---|---|---|---|---|---|
| 1 | - | A | 2005/08/01 08:00:00 | X | 00:01:30 | 00:05:00 | This mountain appears also in that movie. |
| 2 | - | B | 2005/08/01 09:00:00 | X | 00:03:00 | 00:04:30 | Magnificent mountain ! |
| 3 | - | C | 2005/08/02 10:00:00 | X | 00:02:00 | 00:04:00 | What is this mountain ? |
| 4 | 3 | B | 2005/08/01 09:00:00 | X | 00:02:00 | 00:04:00 | Mt. Aso. It's magnificent. |
| 5 | - | A | 2005/08/02 11:00:00 | X | 00:03:00 | 00:33:00 | · · · |
| 6 | - | A | 2005/08/03 12:00:00 | Y | 00:02:00 | 00:21:00 | · · · |

F I G. 4

| Word | Article | Total detection frequency | Estimated value |
|---|---|---|---|
| Mountain | Noun | 10 | 5 |
| Movie | Noun | 2 | 3 |
| Speech | Noun | 3 | 1 |
| Magnificent | Adjective | 5 | 4 |
| Listen | Verb | 15 | 3 |
| ⋮ | ⋮ | ⋮ | ⋮ |

FIG. 7

| User identifier | User name | Date of registration | Group | Number of utterances | Estimated value |
|---|---|---|---|---|---|
| A | ○○ ○○ | 2005/08/01 | G | 13 | 5 |
| B | △△ △△ | 2005/08/01 | G | 20 | 10 |
| C | ×× ××× | 2005/08/02 | H | 5 | 3 |
| ⋮ | ⋮ | ⋮ | ⋮ | ⋮ | ⋮ |

FIG. 8

| Word | Content identifier | Estimated value distribution |
|---|---|---|
| Mountain | Content X | Histogram A |
| Sea | Content Y | Histogram D |
| ⋮ | ⋮ | ⋮ |

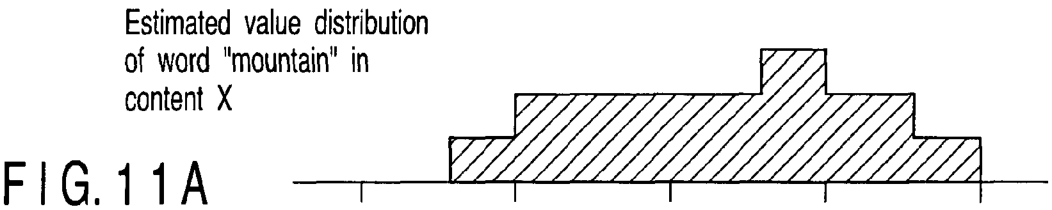
FIG. 11A
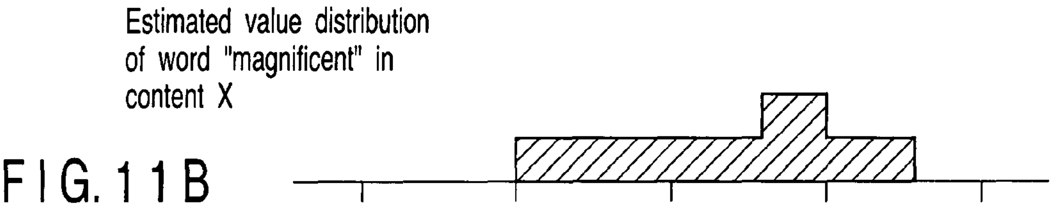
FIG. 11B
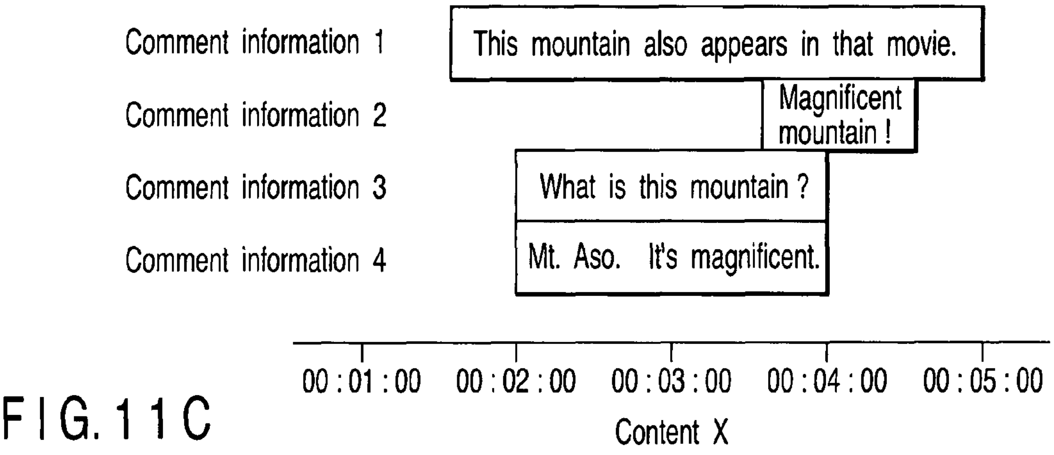
FIG. 11C
| Content identifier | Start time | End time | Scene label |
|---|---|---|---|
| X | 00 : 01 : 30 | 00 : 04 : 00 | Mountain |
| X | 00 : 03 : 00 | 00 : 04 : 30 | Magnificent |
| Y | 00 : 20 : 00 | 00 : 21 : 00 | Sea |
| ⋮ | ⋮ | ⋮ | ⋮ |
FIG. 12

SCENE INFORMATION EXTRACTION METHOD, AND SCENE EXTRACTION METHOD AND APPARATUS

CROSS-REFERENCE TO RELATED APPLICATIONS

This application is based upon and claims the benefit of priority from prior Japanese Patent Application No. 2006-086035, filed Mar. 27, 2006, the entire contents of which are incorporated herein by reference.

BACKGROUND OF THE INVENTION

1. Field of the Invention

The present invention relates to a scene information extraction method, scene extraction method and scene extraction apparatus for extracting, from video content, a zone coherent in meaning.

2. Description of the Related Art

A technique is now being contrived for adding meta-data to digital content that is increasing in delivery amount in accordance with, for example, the spread of broadband, thereby enabling the resultant digital content to be managed and processed efficiently by a computer. For instance, in the case of video content, if meta-data as scene information, which clarifies "who", "what", "how", etc., is attached to time-sequence data contained in the video content, it is easy to retrieve or abstract the video content.

However, if content providers must add all appropriate meta-data, they bear a too heavy burden. To avoid this, the following methods for automatically extracting scene information as meta-data from content information have been proposed:

(1) A method for extracting scene information from speech information contained in video content, or from the correspondence between the text information acquired by recognizing the speech information, and text information contained in the acting script corresponding to the video content (see, for example, JP-A 2005-167452 (KOKAI));

(2) A method for extracting scene information from text information, such as a subtitle, contained in video content, or from the correspondence between the text information contained in the video content, and text information contained in the acting script corresponding to the video content (see, for example, JP-A 2005-167452 (KOKAI)); and (3) A method for extracting scene information from image information, such as cut information extracted from video content However, the above-described prior art contains the following problems:

When utilizing speech information, abstract scene information indicating, for example, "a rising scene", can be extracted, based on, for example, the volume of acclamations, or rough scene information can be extracted, based on a characterizing keyword. However, since the accuracy of speech recognition at present is not so high, subtle scene information cannot be extracted. Further, scene information cannot be extracted from a silent zone.

When utilizing text information, scene information can be extracted by anticipating the shift of subjects of conversation from the shift of words appearing in the text information. However, if video content does not contain text information, such as a subtitle or acting script, this method cannot be used. Furthermore, if text information, such as a subtitle, is added to use the method, this inevitably increases the load on content providers. In this case, it would be better to add scene information as meta-data to video data, together with the text information, than to apply the method to the video content after adding the text information thereto.

When utilizing cut information, cut information itself indicates a very primitive zone, which is too small to be regarded as a zone coherent in meaning. Also, in a program, such as a quiz or news program, where a typical sequence of cut information appears, the sequence can be extracted as scene information. However, such a typical sequence does not appear in all programs.

In addition, in the above-described methods (1) to (3), static information contained in video content is utilized. Therefore, the methods cannot be applied to a dynamic change in scene information (such a change as in which the scene regarded as "cool" has come to be regarded as "interesting").

BRIEF SUMMARY OF THE INVENTION

In accordance with an aspect of the invention, there is provided a scene information extraction apparatus comprising: a first acquisition unit configured to acquire a plurality of comment information items related to video content which defines scenes in a time-sequence manner, each of the comment information items including a comment, and a start time and an end time of the comment; a division unit configured to divide the comment into words by morpheme analysis for each of the comment information items; a second acquisition unit configured to acquire an estimated value of each of the words, the estimated value indicating a degree of importance used at the time that the scenes are extracted; an addition unit configured to add up the estimated value of each of the words for the words during a period of time ranging from the start time of the comment to the end time of the comment that contains a corresponding word included in the words, and to acquire estimated value distributions of the words; and an extraction unit configured to extract a start time and an end time of one scene included in the scenes and to be extracted from the video content, based on a shape of the estimated value distributions.

In accordance with another aspect of the invention, there is provided a scene extraction apparatus comprising an extraction unit configured to extract the scenes using the above-described scene information extraction apparatus.

In accordance with yet another aspect of the invention, there is provided a scene extraction method comprising: acquiring a plurality of comment information items related to video content which defines scenes in a time-sequence manner, each of the comment information items including a comment, and a start time and an end time of the comment; dividing the comment into words by morpheme analysis for each of the comment information items; acquiring an estimated value of each of the words, the estimated value indicating a degree of importance used at the time that the scenes are extracted; adding the acquired estimated value of each of the words for each of the words during a period of time ranging from the start time to the end time of the comment that contains a corresponding word included in the words, and acquiring estimated value distributions of the words; and extracting a start time and an end time of one scene included in the scenes and to be extracted from the video content, based on a shape of the estimated value distributions.

BRIEF DESCRIPTION OF THE SEVERAL VIEWS OF THE DRAWING

FIG. 3 is a table example showing words, articles and comment identifiers;

FIG. 4 is a table illustrating a content example of comment information database;

FIG. 5 is a table example output by the morpheme analysis unit appearing in FIG. 1;

FIG. 7 is a table showing a content example of the morpheme database appearing in FIG. 1;

FIG. 8 is a table showing a content example of the user database appearing in FIG. 1;

FIGS. 11A, 11B and 11C are views showing estimated-value distribution examples concerning content X;

FIG. 12 is a table illustrating a content example stored in the information database appearing in FIG. 1;

DETAILED DESCRIPTION OF THE INVENTION

A scene information extraction method, scene extraction method and scene extraction apparatus according to an embodiment of the invention will be described in detail with reference to the accompanying drawings.

Firstly, the outline of the embodiment will be described.

Users are now communicating with each other by attaching comment information to the time-sequence data of video content through a bulletin board function or chat function. In the embodiment, a zone coherent in meaning is extracted from video content, based on words included in comment information related to the time-sequence data of video content, thereby anticipating scene information of the content and realizing addition of meta-data.

Since comment information reflects how users felt when they viewed certain video content, a zone coherent in meaning can be extracted from the video content, based on the comment information. Further, comment information corresponds to the upsurges of conversation that were not expected by content providers when they provided video content. Namely, the comment information enables users to accelerate their communications through the content. Also, comment information can reflect the thoughts and ideas of users and hence change at all times. For instance, if the number of comments "That's interesting" is increased concerning a certain video content zone labeled "Cool" at a previous time, the label of the video content can be changed to "Interesting". Thus, the embodiment can follow dynamic changes in scene information caused by changes in the thoughts of users.

The scene information extraction method, scene extraction method and scene extraction apparatus according to the embodiment can accurately extract scene information and scenes.

Figure 1:
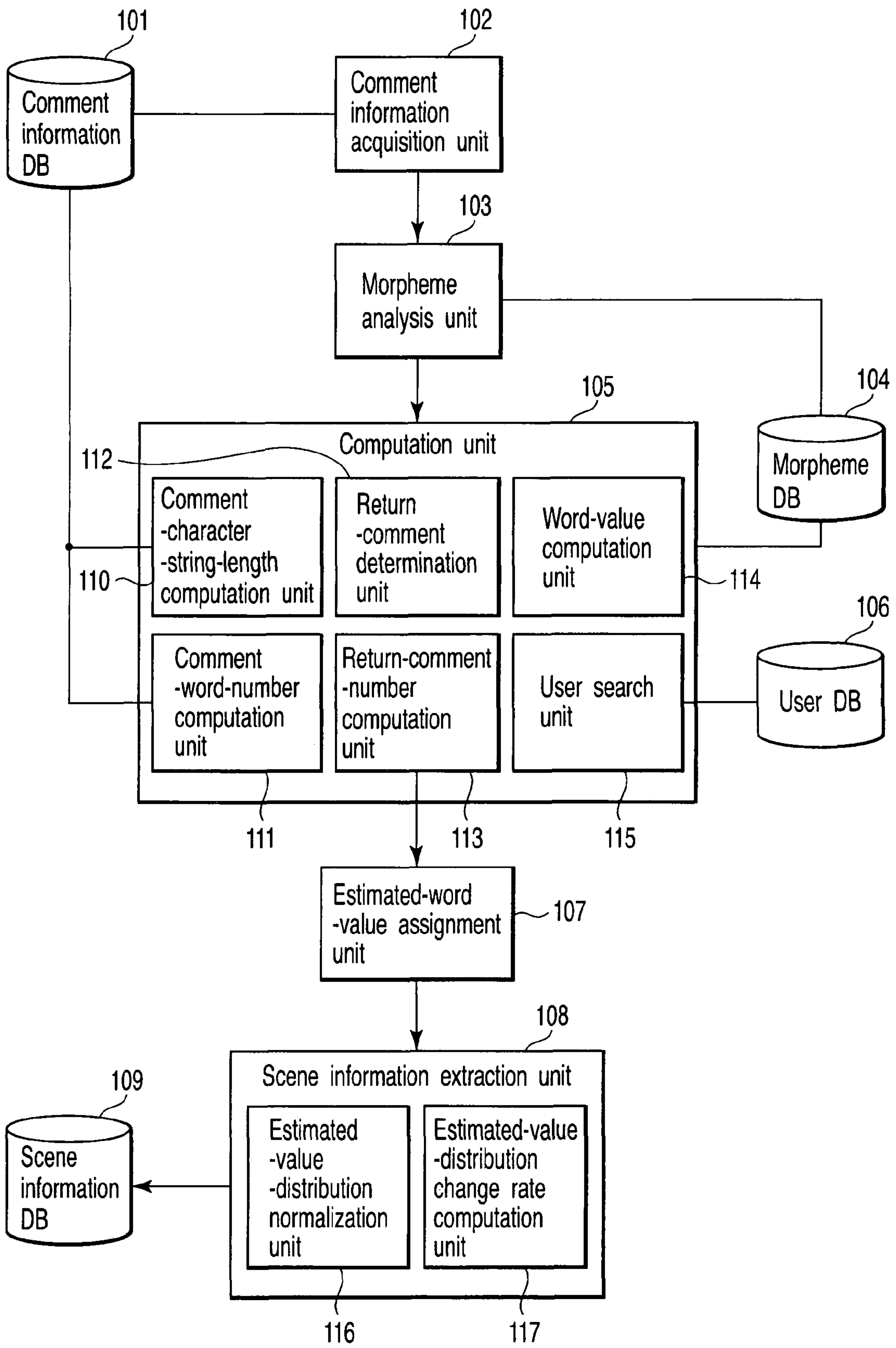
FIG. 1 is a block diagram illustrating a scene information extraction apparatus according to an embodiment.

Referring to FIG. 1, the scene information extraction apparatus of the embodiment will be described.

The scene information extraction apparatus extracts a zone coherent in meaning from video content, based on comment information related to the time-series data of the video content. Scene information contained in the video content is anticipated from words included in the related comment information, and addition of meta-data is realized.

As shown, the scene information extraction apparatus comprises a comment information database (DB) 101, comment information acquisition unit 102, morpheme analysis unit 103, morpheme database (DB) 104, computation unit 105, user database (DB) 106, estimated-word-value assignment unit 107, scene information extraction unit 108 and scene information database (DB) 109. The computation unit 105 includes a comment-character-string-length computation unit 110, comment-word-number computation unit 111, return-comment determination unit 112, return-comment-number computation unit 113, word-value computation unit (estimated-word-value acquisition unit) 114 and user search unit 115. The scene information extraction unit 108 includes an estimated-value-distribution normalization unit 116 and estimated-value-distribution change rate computation unit 117.

The comment information database 101 stores comment information. The comment information is formed of, for example, meta-data and a comment. The meta-data includes a comment identifier, parent comment identifier, user identifier, comment posting time, content identifier, start time and end time. The comment information will be described later with reference to FIG. 4.

The comment information acquisition unit 102 acquires comment information items one by one from the comment information database 101. Specifically, the comment information acquisition unit 102 acquires comment information in units of, for example, comment identifiers, and transfers it to the morpheme analysis unit 103 in units of, for example, comment identifiers.

The morpheme analysis unit 103 subjects the comment included in the acquired comment information to morpheme analysis, and acquires words and the articles of the words from the comment information in units of, for example, comment identifiers. The morpheme analysis unit 103 outputs a table showing the correspondence between each word, its article and a comment identifier (or comment identifies) that indicates the corresponding comment, as shown in FIG. 3. The operation of the morpheme analysis unit 103 will be described later with reference to FIGS. 4 and 5.

The morpheme database 104 computes the estimated value of each word. The estimated value of each word is used to extract an important word for extracting scene information. The more important the word is, the higher estimated value the word should have. The morpheme database 104 stores words, the part of speech of each word, the frequency of occurrence of each word, and the estimated value of each word. The morpheme database 104 will be described later in detail with reference to FIG. 7.

The computation unit 105 computes the estimated value of each word utilizing the correspondence table output from the morpheme analysis unit 103. The specific computation method of the computation unit 105 will be described later with reference to FIG. 6.

The user database 106 stores the estimated value of each user that indicates whether the comments of each user are important to scene information extraction. The user database 106 also stores, for example, user identifiers, user names and the number of statements of each user. Particulars concerning the user database 106 will be described later with reference to FIG. 8.

Whenever video content related to the comments of a user, and the zone(s) of the video content related to the comments are acquired, the estimated-word-value assignment unit 107 assigns, to the acquired zone(s), the estimated value of each word computed by the computation unit 105, thereby acquiring a histogram as the estimated value distribution of each word. Further, the estimated-word-value assignment unit 107 relates each word, a comment identifier (or comment identifiers) corresponding thereto, and a histogram (or histograms) corresponding thereto. An example of correspondence will be described later with reference to FIG. 10. The detailed operation of the estimated-word-value assignment unit 107 will be described later with reference to FIGS. 9 and 11A, 11B and 11C.

The scene information extraction unit 108 performs content zone extraction based on the estimated value distribution of each word generated by the estimated-word-value assignment unit 107. Particulars concerning the scene information extraction unit 108 will be described later with reference to FIGS. 12 to 14.

The scene information database 109 stores information concerning scenes corresponding to zones of video content extracted by the scene information extraction unit 108. Specifically, the scene information database 109 stores, for example, scene labels as words symbolizing the respective scenes, content identifiers, and the start and end times of the scenes. The scene information database 109 will be described later in detail with reference to FIG. 12.

Figure 2:
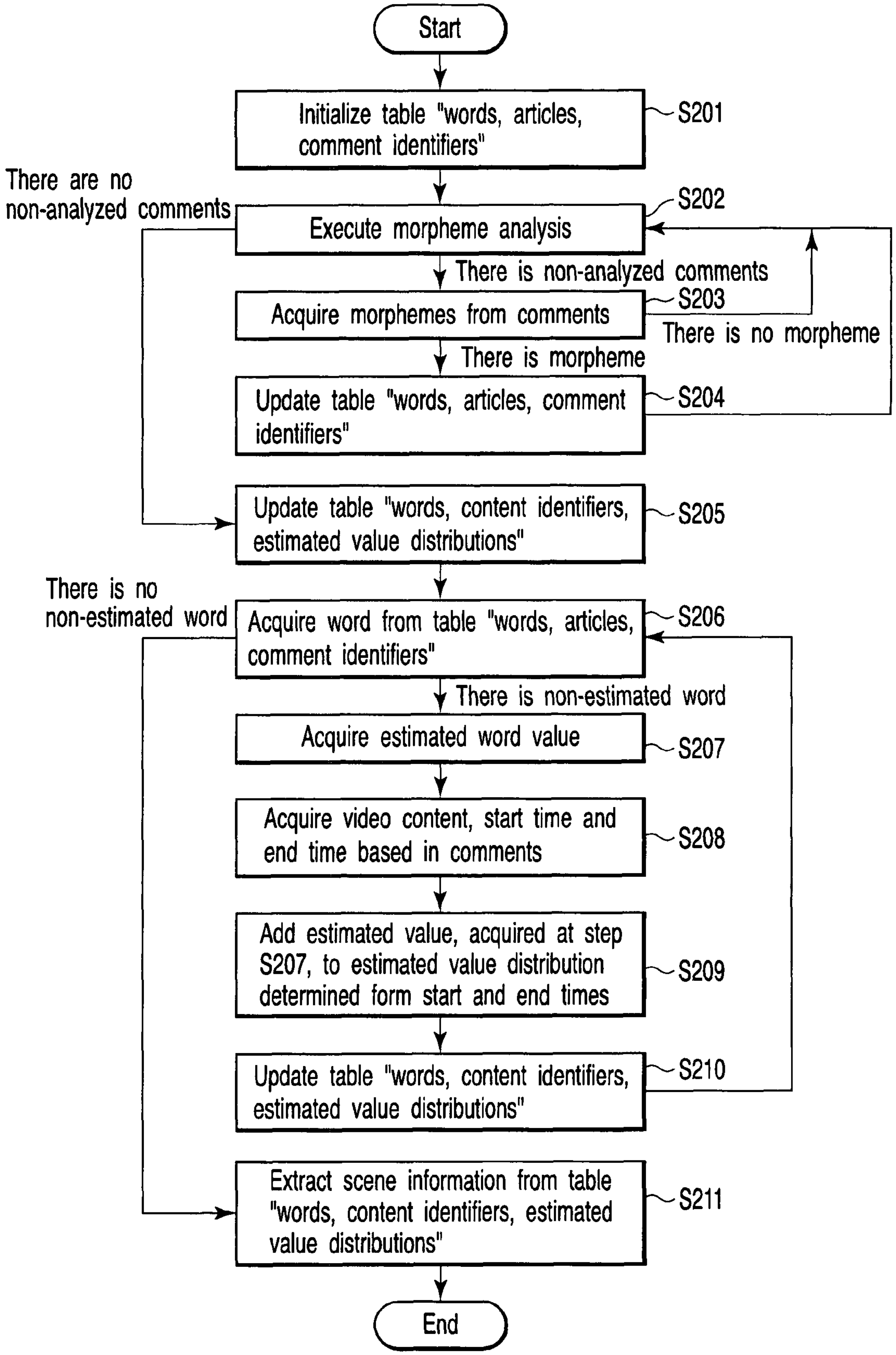
FIG. 2 is a flowchart illustrating the operation of the scene information extraction apparatus of FIG. 1.

Referring back to FIG. 2, the operation of the scene information extraction apparatus of FIG. 1 will be described.

Firstly, the comment information acquisition unit 102 initializes a table that includes, as data of each row, a word, its article and its comment identifier(s) (step S201). FIG. 3 shows an example of the table, and initialization means resetting of the table (empty cells in the table). The table is used as input data for computing the estimated value of each word.

Subsequently, the comment information acquisition unit 102 acquires comment information items one by one from the comment information database 101. If it is determined at step S202 that all comment information acquired from the comment information database 101 is already subjected to morpheme analysis, the morpheme analysis unit 103 proceeds to step S205. In contrast, if there is comment information not yet subjected to morpheme analysis, the morpheme analysis unit 103 proceeds to step S203. Whenever the morpheme analysis unit 103 acquires comment information from the comment information acquisition unit 102, it performs morpheme analysis on the comment information. If it is determined at step S203 that unanalyzed comment information contains no morphemes, the program returns to step S202, whereas if it contains a morpheme, the program proceeds to step S204. At step S204, the morpheme analysis unit 103 updates the table by adding, to the table, the analysis result concerning the newly analyzed morpheme. The table is stored in, for example, a memory (not shown).

Figures 9, 10:
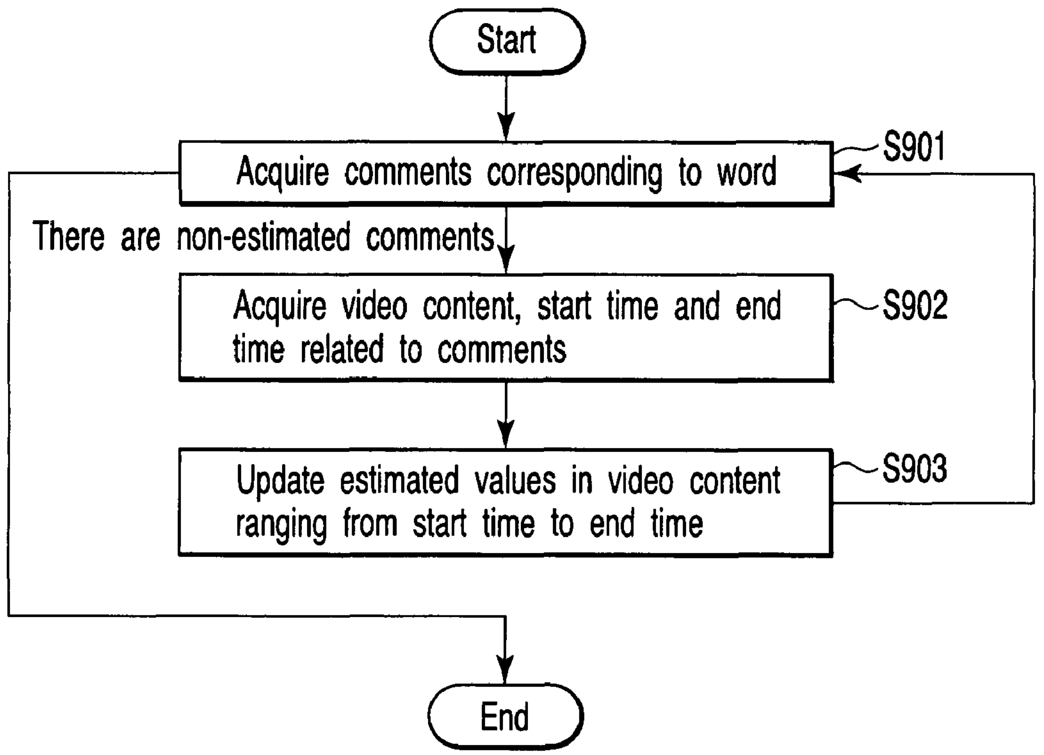
FIG. 9 is a flowchart illustrating the process performed by the estimated-word-value assignment unit appearing in FIG. 1.
FIG. 10 is a view a table example of words, content identifiers and estimated value distributions.

After the comments of all comment information are subjected to morpheme analysis, the computation unit 105 computes or estimates the value of each word, utilizing the table output from the morpheme analysis unit 103. Firstly, the estimated-word-value assignment unit 107, for example, initializes a table that includes, as data of each row, a word, content identifier and estimated value distribution (step S205). FIG. 10 shows an example of the table, and initialization means resetting of the table.

The computation unit 105 acquires a word in units of rows from the table "words, articles, comment identifiers" at step S206. If it is determined at step S206 that the acquired word is not yet estimated, the program proceeds to step S207, whereas if all words in the table "words, articles, comment identifiers" are already estimated, the program proceeds to step S211.

The word-value computation unit 114 incorporated in the computation unit 105 searches the morpheme database 104 for acquiring (computing) the estimated value of the word. After that, the computation unit 105 computes the degree of correction concerning the estimated value of the word in units of comments that contain it, based on the length of the comments, the attribute of the comments, and the estimated value corresponding to a user who has posted the comments (step S207). The estimated values corresponding to users are acquired from the user database 106.

At step S208, the computation unit 105 refers to the comment information database 101 to acquire video content related to the comment identifier(s) corresponding to the word and shown in the table "words, articles, comment identifiers", and the zone of the content related to the comments indicated by the comment identifier(s) (i.e., the start and end times of the content related to the comments).

Whenever the video content related to comments and the zone of the content related thereto are acquired based on the comments, the estimated-word-value assignment unit 107 assigns, to the zone, the estimated word value acquired by the computation unit 105 (step S209). Namely, the estimated-word-value assignment unit 107 adds the estimated value determined at step S207 to the estimated value distribution defined by the start and end times. At step S210, the estimated-word-value assignment unit 107 updates the table "words, content identifiers, estimated value distributions", and returns to step S206 to acquire the next word.

If it is determined at step S206 that there is no word which is not yet subjected to estimation, the scene information extraction unit 108 extracts a content zone (or content zones), i.e., scene information, for which the word acquired at step S206 should be labeled, based on the estimated value distribution generated in units of words by the estimated-word-value assignment unit 107 (step S211).

Referring to FIG. 4, a content example of the comment information database 101 will be described.

FIG. 4 shows an example of a comment information database structure, and examples of comment information stored in the comment information database.

In FIG. 4, comment information with comment identifier 1, for example, indicates that user A has related comments "This mountain appears also in that movie" to the 00:01:30 to 00:05:00 zone of video content with content identifier X. Hereinafter, comments with comment identifier i will be briefly referred to as "comments i", i indicating an arbitrary natural number, and video content with content identifier * will be briefly referred to as "content *", * indicating an arbitrary alphabet. Zones to which comments are related may be preset at regular intervals, such as ten seconds or one minute, by the system regardless of video content. Alternatively, they may be selected arbitrarily by a user from zones divided utilizing image information of video content, such as cut information, when the user posts comments. Further, the start and end times of a zone may be arbitrarily designated by a user when the user posts comments. Yet alternatively, when a user post comments, they may designate only the start time of a zone, and the system may set the end time to impart a preset width, such as ten seconds or one minute, to the zone.

Further, in FIG. 4, when "–" is placed in the parent comment identifier section, it indicates that the comment information has no parent comment information, i.e., it is not return comment information. In contrast, "–" is not placed, the corresponding comment information is return comment information. For instance, comment information 1 has no return comment information, and comment information 3 has return comment information, i.e., comment information 4.

Referring to FIG. 4, the morpheme analysis unit 103 will be described.

If the morpheme analysis unit 103 receives, for example, comment information 1, it divides the comments "This mountain appears also in that movie" into portions, such as "This: adjective", "mountain: noun", "appears: verb", "also: adverb", "in: preposition", "that: adjective" and "movie: noun." These combinations of "words and articles" divided by the morpheme analysis unit 103 are added to the table of FIG. 3, along with the comment identifier assigned to the posted comments. FIG. 5 shows the results of morpheme analysis performed by the morpheme analysis unit 103 on the comment information shown in FIG. 4. In the embodiment, the words acquired by the morpheme analysis are directly added to the table of FIG. 3. However, words, such as "mountain" and "Mt. Aso", which are related to each other or similar in meaning, may be combined using means, such as ontology, for computing the degree of similarity between words.

Figure 6:
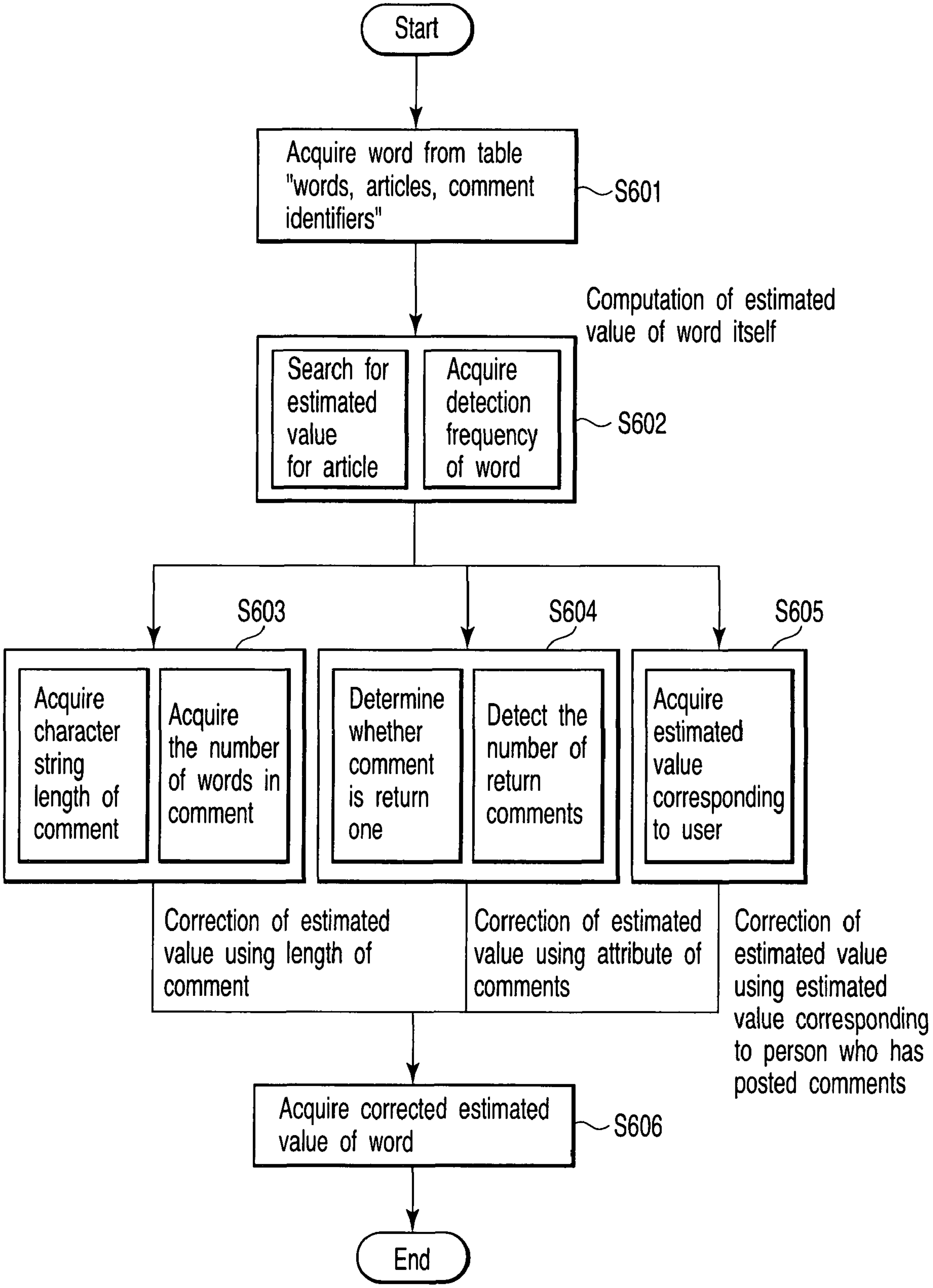
FIG. 6 is a flowchart illustrating the process performed by the computation unit appearing in FIG. 1.

Referring to FIG. 6, the operation of the computation unit 105 will be described. FIG. 6 is a flowchart illustrating the process of the computation unit 105.

After morpheme analysis is performed on the comments of all comment information, the computation unit 105 acquires, by computation, the estimated value of each word using the table generated by the morpheme analysis unit 103. Various word estimation methods are possible. The embodiment employs a method for correcting the estimated values of words, using comment information that contains the words.

Firstly, the computation unit 105 acquires a combination of a word, article and comment identifier(s) from the table generated by the morpheme analysis unit 103 (step S601). Subsequently, the word-value computation unit 114 searches the morpheme database 104 for acquiring (computing) the estimated value of the word (step S602). FIG. 7 shows a structure example of the morpheme database 104, and examples of morpheme information stored in the morpheme database 104. FIG. 7 indicates, for example, that the word "mountain" is a noun, the total detection frequency is 10, and the estimated value of the word is 5.

It is considered that higher estimated values should be imparted to words, such as nouns and verbs, which are detected at a lower frequency and have a greater information quantity than words, such as prepositions and pronouns. In light of this, different estimated values are preset for different articles. Alternatively, estimated values may be preset in units of words, based on the meaning of each word and character string length of each word. Yet alternatively, instead of directly using an estimated value set for each word, the estimated value of a word may be divided by the detection frequency of the word (for example, if a certain word appears twice in certain comments, the estimated value of the word is set to ½), or the estimated value of each word may be updated based on the total detection frequency (to reduce the estimated values of often used words so as not to bury a not often used word in the first-mentioned ones). Thus, the estimated value of each word may be determined from its detection frequency.

After that, the computation unit 105 computes the degree of correction of the estimated value of each word in units of comments that contain it, based on the length of comments, the attribute of the comments, or the estimated value corresponding to the user who has posted the comments (steps S603, S604 and S605).

The reason why correction is performed based on the length of comments is that the estimated value of "mountain" contained in a long comment full of knowledge, such as "This mountain erupted in 19xx, and . . . in 19xx", should be discriminated from that of "mountain" contained in a short comment, such as "That's a mountain!" The length of comments is, for example, the length of the character string of the comment, or the number of words included in the comment. The comment-character-string-length computation unit 110 measures the character string length of a comment, and the comment-word-number computation unit 111 counts the number of words included in the comment (step S603). Assuming that the character string length is L and the number of words in a comment is N1, correction utilizing the length of a comment can be performed using, for example, the expression $\alpha L+\beta N1$ ($\alpha$ and $\approx$ being appropriate coefficients). Based on this expression, the computation unit 105 performs correction.

The reason why correction is performed based on the attribute of a comment is that a return comment reflect the content of a parent comment, and that it is considered that a comment with a large number of return comments much influence other comments. Whether or not the comments are return ones, or the number of return comments can be regarded as an attribute. The return-comment determination unit 112 determines whether the comments are return ones and the return-comment-number computation unit 113 computes the number of return comments (step S604). Assume here that R indicates whether the comment is return one (if R is 1, the comment is determined to be return one, whereas if R is 0, the comment is determined not to be return one), and that the number of return comments is N2. In this case, the degree of correction based on the attribute of the comments can be expressed using the expression $\gamma R+\delta N2$ ($\gamma$ and $\delta$ being appropriate coefficients). Based on this expression, the computation unit 10S performs correction. Further, correction may be performed by attaching, to comment, comment attribute information that indicates whether the comment relate to "question", "answer", "exclamation", "storage of information" or "spoiler", when a user posts the comment.

The reason why correction is performed based on estimated values corresponding to users is that the estimated value of a word in comments posted by a junior user of few utterances should be discriminated from that of a word in comments posted by a senior user of many utterances. The user search unit 115 searches the user information database for computing the degree of correction using an estimated value corresponding to a user (step S605). For instance, the computation unit 105 reduces the estimated value of a word in comments posted by a junior user of few utterances, and increases that of a word in comments posted by a senior user of many utterances.

After that, the computation unit 105 performs one of the above-described corrections to thereby acquire a corrected estimated value.

Referring to FIG. 8, the user database 106 which is referred to at step S605 will be described. FIG. 8 shows a user information database example, and user information examples stored in the user information database.

The user database 106 may set an estimated value in units of groups to which each user belongs, or may update an estimated value for each user in accordance with the frequency of their utterances. Alternatively, the user database 106 may update an estimated value for a certain user in light of the votes (such as "acceptable", "unacceptable", "useful" and "useless"), of other users who have read the utterance of the certain user. In FIG. 8, user A, for example, belongs to group G, made utterance 13 times, and the estimated value corresponding to them is 5.

Referring to FIG. 9, the process performed by the estimated-word-value assignment unit 107 will be described.

Firstly, the estimated-word-value assignment unit 107 initializes the table "words, content identifiers, estimated value distributions" shown in FIG. 10. Initialization means resetting of the table. The table is used later as input data for extracting a word zone. Subsequently, the estimated-word-value assignment unit 107 acquires a single combination of a word, article and comment identifier(s) from the table "words, articles, comment identifiers". After that, the estimated-word-value assignment unit 107 acquires comments (uniquely determined from the comment identifier(s) included in the acquired combination) corresponding to the word included in the acquired combination (step S901). If the acquired comments contain a word that has no estimated value distribution, the program proceeds to step S902, whereas if all words contained in the acquired comments have corresponding estimated value distributions, the program is finished.

Based on the comments acquired at step S901, the estimated-word-value assignment unit 107 acquires video content related to the comments, and the zone(s) of the video content related to the comments (S902). For instance, in the table of FIG. 5, the word "mountain" corresponds to comment information 1, comment information 2 and comment information 3. From FIG. 4, the 00:01:30 to 00:05:00 zone, the 00:03:00 to 00:04:30 zone and the 00:02:00 to 00:04:00 zone of video content with content identifier X are determined to correspond to the comments acquired at step S901. Similarly, the word "magnificent" corresponds to comment information 2 and comment information 4, and hence the 00:03:00 to 00:04:30 zone and the 00:02:00 to 00:04:00 zone of the video content with content identifier X are determined to correspond to the comments acquired at step S901.

Whenever the estimated-word-value assignment unit 107 acquires video content related to the comments, and the zone(s) of the video content related to the comments, it assigns, to the zone(s), the estimated value of each word acquired by the computation unit 105, and updates the table "words, content identifiers, estimated value distribution" (step S903). Assuming that all words in all comment information have an estimated value of 1 for facilitating the description, the estimated value distributions concerning the word "mountain" in the video content X are set to 1 in the 00:01:30 to 00:02:00 zone and 00:04:30 to 00:05:00 zone, to 2 in the 00:02:00 to 00:03:30 zone and 00:04:00 to 00:04:30 zone, and to 3 in the 00:03:30 to 00:04:00 zone, referring to FIGS. 11A, 11B and 11C. Similarly, the estimated value distributions concerning the word "magnificent" in the video content X are set to 1 in the 00:02:00 to 00:03:30 zone and 00:04:00 to 00:04:30 zone, and to 2 in the 00:03:30 to 00:04:00 zone.

Figure 13:
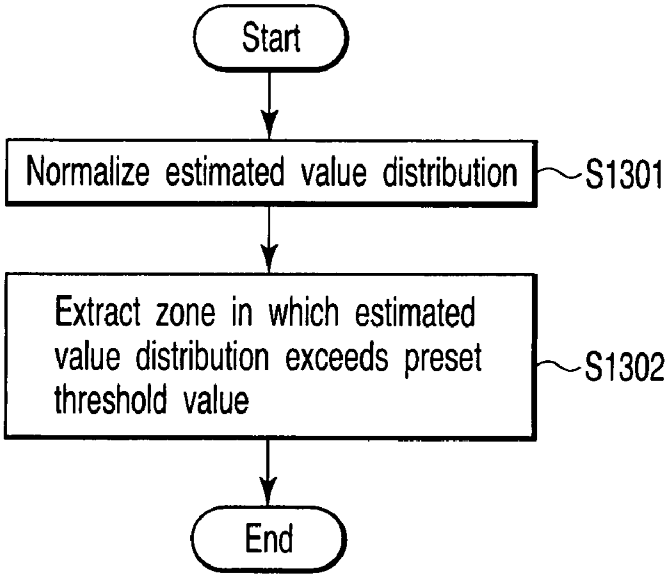
FIG. 13 is a flowchart illustrating the processes performed by the scene information extraction unit and estimated-value-distribution normalization unit appearing in FIG. 1.
Figure 14:
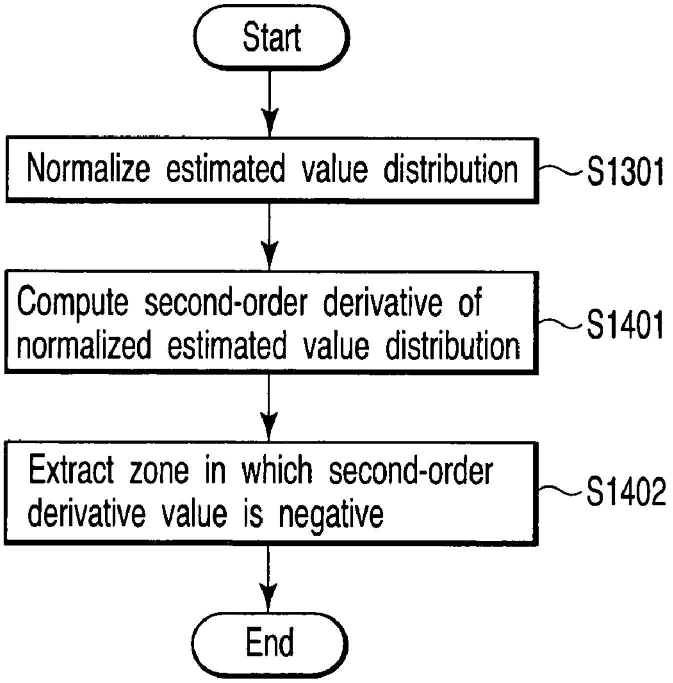
FIG. 14 is a flowchart illustrating the processes performed by the scene information extraction unit, estimated-value-distribution normalization unit and estimated-value-distribution change rate computation unit appearing in FIG. 1.

Referring then to FIGS. 12 to 14, the scene information extraction unit 108 will be described.

Whenever the estimated-word-value assignment unit 107 generates an estimated value distribution for a word, the scene information extraction unit 108 extracts, from video content, a zone (zones) for which the word should be labeled. Namely, the scene information extraction unit 108 generates, for example, the table formed of content identifiers, start times, end times and scene labels, shown in FIG. 12. The table shown in FIG. 12 is stored in the scene information database 109. In other words, the scene information database 109 stores the extracted scene information.

To extract word zones, a method for extracting a zone in which the estimated value distribution exceeds a preset threshold value (see FIG. 13), or a method for performing zone extraction by paying attention to the rate of change in estimated value distribution (see FIG. 14), etc., can be employed. These methods will be described.

FIG. 13 is a flowchart illustrating the method for extracting a zone in which the estimated value distribution exceeds a preset threshold value. The scene information extraction unit 108 normalizes an estimated value distribution (step S1301), and then extracts a zone in which the estimated value distribution exceeds a preset threshold value (step S1302).

FIG. 14 is a flowchart illustrating the method for performing zone extraction by paying attention to the rate of change in estimated value distribution. The scene information extraction unit 108 normalizes an estimated value distribution (step S1301), and then computes the second-order derivative of the normalized estimated value distribution (step S1401). After that, the scene information extraction unit 108 extracts a zone in which the computed second-order derivative value is negative, i.e., the estimated value distribution is upwardly convex (step S1402). Further, a player, for example, refers to the scene information database 109 to extract, from video content, a scene corresponding to the scene information. In other words, the player can perform scene replay by extracting the scene corresponding to the content zone that corresponds to scene information.

As described above, in the embodiment, a zone coherent in meaning can be extracted. Further, scene information of video content can be anticipated and meta-data can be attached thereto, by extracting a zone coherent in meaning. In addition, the embodiment can follow a dynamic change in scene information due to a change in the interest of users. Accordingly, the embodiment can accurately extract scene information and scenes.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A scene information extraction apparatus comprising:

a first acquisition unit configured to acquire a plurality of comment information items related to video content which defines scenes in a time-sequence manner, each of the plurality of comment information items including a comment, and a start time and an end time of the comment, the comment corresponding to a user who has viewed the video content;

a division unit configured to divide the comment into words by morpheme analysis for each of the plurality of comment information items;

a second acquisition unit configured to acquire an estimated value of each of the words, the estimated value indicating a degree of importance used at a time that a scene corresponding to a zone of the video content extracted;

an addition unit configured to add the estimated value of each of the words for the words during a period of time ranging from the start time of the comment to the end time of the comment that contains a corresponding word included in the words, and to acquire estimated value distributions of the words; and an extraction unit configured to extract a start time and an end time of one scene included in the scenes and to be extracted from the video content, based on a shape of the estimated value distributions.

2. The apparatus according to claim 1, wherein the extraction unit is configured to extract, from the estimated value distributions, a start time and an end time of a zone of the video content corresponding to one of the estimated value distributions which exceeds a threshold value.

3. The apparatus according to claim 1, wherein the extraction unit is configured to extract, from the estimated value distributions, a start time and an end time of a zone of the video content corresponding to one of the estimated value distributions which is upwardly convex.

4. The apparatus according to claim 1, wherein the second acquisition unit is configured to acquire the estimated value of each of the words, based on an article of each of the words and a frequency of detection of each of the words.

5. The apparatus according to claim 4, wherein the extraction unit is configured to extract, from the estimated value distributions, a start time and an end time of a zone of the video content corresponding to one of the estimated value distributions which exceeds a threshold value.

6. The apparatus according to claim 4, wherein the extraction unit is configured to extract, from the estimated value distributions, a start time and an end time of a zone of the video content corresponding to one of the estimated value distributions which is upwardly convex.

7. The apparatus according to claim 1, wherein the second acquisition unit is configured to acquire the estimated value of each of the words, based on a character string length of the comment which contains each of the words, and number of words included in the comment which contains each of the words.

8. The apparatus according to claim 7, wherein the extraction unit is configured to extract, from the estimated value distributions, a start time and an end time of a zone of the video content corresponding to one of the estimated value distributions which exceeds a threshold value.

9. The apparatus according to claim 7, wherein the extraction unit is configured to extract, from the estimated value distributions, a start time and an end time of a zone of the video content corresponding to one of the estimated value distributions which is upwardly convex.

10. The apparatus according to claim 1, wherein the second acquisition unit is configured to acquire the estimated value, based on whether the comment containing each of the words is a return comment, and based on number of return comments corresponding to the comment containing each of the words.

11. The apparatus according to claim 10, wherein the extraction unit is configured to extract, from the estimated value distributions, a start time and an end time of a zone of the video content corresponding to one of the estimated value distributions which exceeds a threshold value.

12. The apparatus according to claim 10, wherein the extraction unit is configured to extract, from the estimated value distributions, a start time and an end time of a zone of the video content corresponding to one of the estimated value distributions which is upwardly convex.

13. The apparatus according to claim 1, wherein the second acquisition unit is configured to acquire the estimated value, based on an estimated value corresponding to the user.

14. The apparatus according to claim 13, wherein the extraction unit is configured to extract, from the estimated value distributions, a start time and an end time of a zone of the video content corresponding to one of the estimated value distributions which exceeds a threshold value.

15. The apparatus according to claim 13, wherein the extraction unit is configured to extract, from the estimated value distributions, a start time and an end time of a zone of the video content corresponding to one of the estimated value distributions which is upwardly convex.

16. A scene extraction apparatus comprising a scene extraction unit configured to extract the scenes using the scene information extraction apparatus as claimed in claim 1.

17. The apparatus according to claim 1, wherein the comment reflects how the user felt when the user viewed the video content.

18. The apparatus according to claim 1, werein the estimated value distribution of each one word of the words includes a sum of a plurality of estimated values of the one word, the plurality of estimated values corresponding to a subset of the plurality of comment information items for which the comments include the one word.

19. A scene information extraction method comprising:

acquiring a plurality of comment information items related to video content which defines scenes in a time-sequence manner, each of the plurality of comment information items including a comment, and a start time and an end time of the comment, the comment corresponding to a user who has viewed the video content;

dividing the comment into words by morpheme analysis for each of the plurality of comment information items;

acquiring an estimated value of each of the words, the estimated value indicating a degree of importance used at a time that the a scene corresponding to a zone of the video content is extracted;

adding the acquired estimated value of each of the words for each of the words during a period of time ranging from the start time to the end time of the comment that contains a corresponding word included in the words, and acquiring estimated value distributions of the words; and extracting a start time and an end time of one scene included in the scenes and to be extracted from the video content, based on a shape of the estimated value distributions.

20. A scene extraction method comprising extractiong the scenes using the scene information extraction method as claimed in claim 19.

* * * * *

UNITED STATES PATENT AND TRADEMARK OFFICE

CERTIFICATE OF CORRECTION

PATENT NO. : 8,001,562 B2
APPLICATION NO. : 11/723227
DATED : August 16, 2011
INVENTOR(S) : Yamasaki et al.

It is certified that error appears in the above-identified patent and that said Letters Patent is hereby corrected as shown below:

Claim 1, column 10, line 61, change “extracted” to --is extracted--.

Claim 19, column 12, line 41, change “that the” to --that--.

Claim 20, column 12, line 53, change “extractiong” to --extracting--.

Signed and Sealed this
Fifteenth Day of November, 2011

David J. Kappos
*Director of the United States Patent and Trademark Office*